(12) United States Patent
Bonanni et al.

(10) Patent No.: US 11,536,942 B2
(45) Date of Patent: Dec. 27, 2022

(54) DEVICE FOR MOUNTING AN OBJECT HOLDER

(71) Applicant: Universität Linz, Linz (AT)

(72) Inventors: Alberta Bonanni, Ottensheim (AT); Rajdeep Adhikari, Linz (AT); Philip Lindner, Mauthausen (AT); Patrick Rubert Raab, Schoenau im Muehlkreis (AT); Bogdan Faina, Linz (AT); Klemens Doesinger, Schlierbach (AT)

(73) Assignee: Universität Linz, Linz (AT)

( * ) Notice: Subject to any disclaimer, the term of this patent is extended or adjusted under 35 U.S.C. 154(b) by 366 days.

(21) Appl. No.: 16/843,546

(22) Filed: Apr. 8, 2020

(65) Prior Publication Data
US 2020/0341258 A1    Oct. 29, 2020

(30) Foreign Application Priority Data

Apr. 23, 2019   (AT) ............................... A50370/2019

(51) Int. Cl.
| | |
|---|---|
| *G02B 21/28* | (2006.01) |
| *G01N 1/42* | (2006.01) |
| *G02B 21/26* | (2006.01) |
| *B82Y 35/00* | (2011.01) |

(52) U.S. Cl.
CPC .............. *G02B 21/28* (2013.01); *G01N 1/42* (2013.01); *G02B 21/26* (2013.01); *B82Y 35/00* (2013.01)

(58) Field of Classification Search
CPC .......... G02B 21/28; G02B 21/26; G01N 1/42; B82Y 35/00
USPC ................. 250/440.11, 441.11, 442.11, 443.1
See application file for complete search history.

(56) References Cited

U.S. PATENT DOCUMENTS

| | | | |
|---|---|---|---|
| 4,871,938 A | 10/1989 | Elings et al. | |
| 5,070,935 A | 12/1991 | Sitte et al. | |
| 5,559,330 A | * 9/1996 | Murashita | .............. G01Q 30/02 850/10 |
| 6,909,273 B1 | 6/2005 | Lau | |
| 2005/0083056 A1 | * 4/2005 | Harvey | .............. G01R 33/3854 324/318 |
| 2011/0321203 A1 | 12/2011 | Shibuya et al. | |
| 2017/0234766 A1 | * 8/2017 | Haft | .................. G01M 11/0214 356/244 |
| 2017/0314843 A1 | * 11/2017 | Dal Savio | ............. F25D 19/006 |

* cited by examiner

FOREIGN PATENT DOCUMENTS

| | | |
|---|---|---|
| ES | 2 396 331 | 2/2013 |
| WO | WO 88/02851 A1 | 4/1988 |
| WO | WO 2015/084169 A1 | 6/2015 |

*Primary Examiner* — Nicole M Ippolito
(74) *Attorney, Agent, or Firm* — Muirhead and Saturnelli, LLC

(57) ABSTRACT

A device for mounting an object holder on a carrier that can be inserted into a cryostat includes at least one clamping element may be provided for non-positive connection of the object holder with the carrier. The at least one clamping element is arranged to enable damage-free mounting of the object holder on the carrier even in the case of large temperature changes, so that reproducible measuring conditions are created at large temperature changes. The at least one clamping element may be drive-connected via a lever to a piezoelectric element, which may be subjected to voltage by a control device as a function of temperature and of a bearing specification and is supported against the object holder or the carrier.

16 Claims, 3 Drawing Sheets

DEVICE FOR MOUNTING AN OBJECT HOLDER

TECHNICAL FIELD

The system described herein relates to a device for mounting an object holder on a carrier which can be placed in a cryostat.

BACKGROUND OF THE INVENTION

Microscopes suspended in a cryostat with vibration damping (e.g., as described in Spanish patent application ES2396331A1), which have a carrier for an object holder, are known from the prior art. However, a disadvantage of such devices is that large temperature fluctuations, for example, between room temperature and a low temperature (i.e., 1.5-300K), lead to thermally induced deformation of the components involved. This means that individual involved components with different coefficients of thermal expansion shift or wedge against each other, which makes the reproducibility of measurements considerably more difficult, or even leads to damage to the carrier or the object holder. Mechanical systems for compensation of thermal deformation are subject to the same problems due to their typically different material composition. In addition, the movement of mechanical components in relation to each other causes a certain amount of friction, the waste heat of which can result in an impairment of the measuring accuracy, especially in low-temperature measurements.

Piezoelectric elements used for positioning individual microscopy elements, such as test samples, have material properties that are strongly dependent on temperature, in particular they are subject to strong thermal deformation.

What is desired is a microscope that, even with large temperature changes, damage-free mounting of the object holder on the carrier is possible, so that reproducible measuring conditions are created even with large temperature changes.

SUMMARY OF THE INVENTION

In embodiments of the system described herein, at least one clamping element is provided for the non-positive connection of the object holder with the carrier where the at least one clamping element is drive-connected via a lever to a piezoelectric element which is subjected to voltage by a control device as a function of temperature and of a bearing specification and is supported against the object holder or the carrier. Via the control element, a voltage selected depending on the temperature may be applied in the case of an appropriate bearing specification to the piezoelectric element via the control device, which causes its mechanical expansion. Due to this expansion, the piezoelectric element exerts mechanical force on the lever which non-positively connects the clamping element to the carrier or object holder, depending on whether the clamping element is assigned to the object holder or the carrier. Since the expansion of the piezoelectric element may be strongly temperature-dependent, i.e., only 10% of the room temperature standard stroke is available at 4 Kelvin, temperature compensation of the voltage applied to the piezoelectric element may be required for a non-positive connection between the object holder and the carrier.

A non-positive connection may be understood herein to mean a mechanical fixation of the object holder on the carrier, for example, due to the compressive force of the clamping element on the carrier or object holder caused by the piezoelectric element and transmitted by the lever. In the simplest case, the bearing specification indicates as a bivalent manipulated variable whether the object holder should be mounted in a non-positive connection with the carrier or released from the carrier. In the case of a bearing specification for a non-positive connection, the compressive force between the clamping element and the carrier or object holder may be within the range of the minimum effect required to mount the object carrier. In an embodiment, however, the bearing specification also may form a multi-valent manipulated variable so that the compressive force applied to the clamping elements may be predetermined beyond the range of the minimum effect required. In order to better predetermine the position of the clamping element, the clamping element, which may be drive-connected to the piezoelectric element via the lever, may be displaced against the force of a restoring element. A clamping element may be understood herein to mean a body whose purpose is to transmit the compressive forces (e.g., transmitted by a piezoelectric crystal via the lever) to the carrier or object holder. In order to minimize occurring friction during the non-positive connection between the clamping element and the carrier, the clamping element may be designed as a rolled or spherical body, for example. Depending on the selected design conditions and the required adjustment travel of the piezoelectric element, it may be made up of a single piezoelectric crystal or a piezoelectric stack.

Experiments have shown that, especially with large temperature fluctuations, the ratio between the expansion of the piezoelectric element and the applied voltage is subject to a non-linear change, where the voltage increases with decreasing temperature according to a predetermined characteristic curve. Accordingly, the control device may include a characteristic curve memory which has a voltage specification for the piezoelectric element for predetermined temperature values and predetermined bearing specifications.

In order to be able to transmit the occurring compressive forces more evenly, at least two clamping elements may be arranged on a stop-limited clamping bracket which is connected to the lever in a shear-resistant manner. As a result of this arrangement, the compressive forces generated by a piezoelectric element may be distributed to several clamping elements, where a limit stop of the clamping bracket along the axis of action of the lever limits the available adjustment travel, so that damage to the object carrier and/or the carrier in the event of electrostatic discharges may be avoided.

In order to be able to use high actuating forces of the piezoelectric element of 1000N and more safely for the support of the object holder on the carrier while at the same time keeping the size small. The lever may have a base leg from which a short force arm, drive-connected to the piezoelectric element, and a long force arm, drive-connected to the clamping element, protrude. The pivot point of the lever may lie in the transition area between the base leg and the short force arm. The long force arm may be arranged essentially parallel to the longitudinal axis of the piezoelectric element. In this way, the thrust forces acting in the longitudinal axis of the piezoelectric element may be deflected by 90° towards the clamping elements. In this case, the actuating forces acting on the clamping element may be adjusted depending on the characteristics of the piezoelectric element via the position of the pivot point of the lever within the scope of simple dimensioning tasks, regardless of whether the drive connection with the clamping element is made directly or via a stop-limited clamping bracket.

The frictional heat that inevitably occurs at the contact points between the object holder and the carrier in the event of temperature changes may be minimized in that the object holder may be non-positively connected to the carrier exclusively via at least two clamping elements, which may be drive-connected via levers to at least two piezoelectric elements supported against the object holder. This arrangement furthermore offers a freer positioning of the object holder in the carrier, since each contact point may be controlled by its own piezoelectric element. Depending on the design of the geometry of the object holder and carrier, the clamping elements may be positioned in such a way that the forces exerted by the clamping elements on the carrier are balanced.

In order to prevent an uneven mechanical actuation of the clamping elements and still allow a compact design, the at least two piezoelectric elements may be arranged in receptacles of the object holder provided for this purpose, and the piezoelectric elements lying in at least one drive plane may be drive-connected via levers to clamping elements lying in a plane of action arranged parallel to the at least one drive plane. In the field of low-temperature measurement, a compact design is advantageous in order to minimize undesirable thermal expansion effects. However, the relatively large dimensions of the piezoelectric elements make a compact design difficult if a uniform actuation of the clamping elements is to be achieved at the same time. Such difficulty arises because such uniform activation requires lever arms of essentially the same length or, overall, a mechanical transmission of force from the piezoelectric elements to the clamping elements that is as similar as possible in design; otherwise the thermal deformation of the materials would have an uneven effect on the clamping elements and would make the regulation of the clamping forces significantly more difficult.

By introducing at least one drive plane separate from the plane of action, force arms of equal length may be realized by slightly increasing the dimensions of the object holder, where the clamping elements lie on a single plane of action to allow uniform mounting without occurring shear forces. In this case, the individual lever arms may be designed in such a way that they project from the respective drive plane into the plane of action. These arrangements provide greater flexibility in the arrangement of the piezoelectric elements, because they may be arranged not only in one drive plane, as would be possible with two piezoelectric elements, but also in several drive planes. If there are more than two piezoelectric elements, the arrangement in several drive planes may be particularly useful, since the most efficient circumferential distance between the clamping elements may be 360°/n, wherein 'n' denotes the number of clamping elements, so that for odd n, each piezoelectric element may be provided in its own drive plane, while for even n, as described below, two piezoelectric elements may be arranged point-symmetrically to each other in one drive plane.

In an embodiment of the system described herein, the at least two piezoelectric elements are arranged parallel to each other in one drive plane, and the levers extend in a point-symmetrical manner with respect to each other and connect the piezoelectric elements to the clamping elements via clamping brackets located in the plane of action. The drive connection between the two planes may be made via the levers if the levers are designed in such a way that the short force arm drive-connected to the piezoelectric element extends from the drive plane into the plane of action and is attached to the base leg of the lever there. In this case, a bearing for the pivot point of the lever may be provided in the drive plane in a structurally advantageous manner. The long force arm of the lever extends in the plane of action from the force leg to the respective clamping bracket, which may be limited by a limiting element located in the plane of action. This embodiment may be characterized by its particular compactness, since due to the parallel arrangement of the piezoelectric elements, the point-symmetrical arrangement of the levers and the clamping brackets, only one drive plane and one plane of action may be required. In this embodiment, it is therefore possible to ensure particularly efficient utilization of the given carrier volume at the given carrier geometry.

For low-temperature precision measurements, the measurement environment places additional demands on the materials used. These include, depending on the field of application, optimized thermal insulation or heat exchange with the environment, as well as the use of components with low manufacturing tolerances. In order to meet these requirements efficiently, the carrier may form a circular hollow cylinder whose inner diameter exceeds the largest outer diameter of the object holder, and the clamping elements non-positively connected to the carrier may protrude beyond the largest outer diameter of the object holder. This manufacturing method minimizes the surface of the carrier due to its geometric properties on the one hand, and reduces the manufacturing effort on the other hand, since bodies with a simple, symmetrical base surface may be manufactured more easily, and thus more precisely, than geometrically more complex embodiments. A further advantage of this symmetrical design is that the object holder may be positioned more freely in the carrier under measurement conditions. Although the object holder may have different basic shapes within the carrier, advantageous manufacturing conditions also may be obtained for said object holder if it has a circular disc shape.

The preparation of a specimen, or the replacement of a specimen holder in a high-precision measuring device, may be very time-consuming due to the complex design of the device according to embodiments of the system described herein, in particular for low-temperature measurements. Furthermore, thermally induced deformations of the material may lead to insertion or removal of the specimen holder only being able to be carried out after lengthy and material-tiring temperature changes, which may be accompanied by changed measuring conditions when measuring again under the same environmental conditions. These problems may be addressed by operating a device according to embodiments of the system described herein, in which the object holder is inserted into the carrier at an initial temperature and a bearing specification for the control device that prevents a non-positive connection with the carrier, after which a bearing specification for a non-positive connection with the carrier is predetermined and the control device adapts the voltage applied to the piezoelectric elements as a function of the temperature according to a characteristic curve. As a result of these measures, not only may the object holder be connected to the carrier at any desired initial temperature, but reproducible measurements of a specimen positioned on the object holder, for example, also may be made at different measurement temperatures.

It is known that the precision of a measurement in the (sub)nanometer range may be increased by avoiding interference signals in the measurement data acquisition and the measurement setup. While the measurement data acquisition already minimizes interference signals due to thermal noise as a result of the low temperature conditions, falsifying interferences due to resonances of the components used may become all the more significant. In order to suppress resonance effects occurring in this context, the bearing specification and/or the voltage applied to the piezoelectric elements may be varied within a predetermined value range when resonance effects occur until the resonance effects have reached a minimum. By using a control device connected to a resonance detector for adjusting the voltage applied to the piezoelectric elements as a function of the oscillation behavior of the device, the natural resonance of the device may be changed via the resulting non-positive connection of the clamping elements between the carrier and the object holder. Such natural resonance also may be changed via the material stiffness of the piezoelectric elements, which varies depending on the applied voltage or forces acting. Changing the natural resonance of the device to reduce oscillations may increase measuring precision. The minimum force required for a non-positive connection as defined by the bearing specification may be deliberately exceeded in order to influence the oscillation behavior of the device. The adjustment of this force may be made by taking into account the output of a resonance detector. The output of the resonance detector may be used directly for purposes of measuring, in which the quality of the read-out data serves as a reference, or a separate device that is capable of recording the material vibrations may be used. The acting clamping forces as well as the material properties of the piezoelectric elements also may be varied depending on the voltage applied to the piezoelectric elements, where it may be essentially irrelevant whether the applied voltage is varied independently of the bearing specification for suppressing resonance effects or whether the bearing specification itself is changed within a predetermined, permissible value range. A predetermined value range may be regarded as all those values for the bearing specification and/or the voltage applied to the piezoelectric elements which, on the one hand, do not endanger the safe mounting of the object holder on the carrier via the non-positive connection and, on the other hand, do not lead to damage to the components.

BRIEF DESCRIPTION OF THE DRAWINGS

Embodiments of the system described herein are shown in the drawing by way of example, wherein.

DESCRIPTION OF VARIOUS EMBODIMENTS

Figure 1:
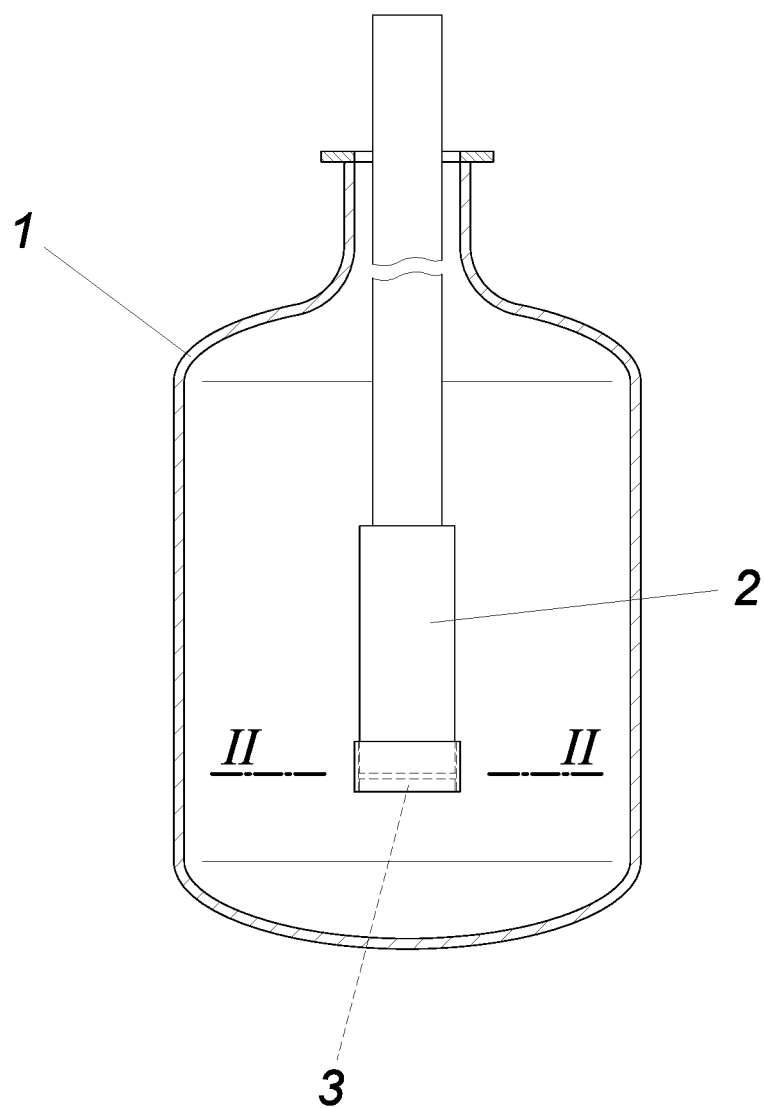
FIG. 1 shows a schematic section through a cryostat with a device according to an embodiment of the system described herein.

A device according to an embodiment of the system described herein may have a carrier 2 which may be introduced into a cryostat 1. An object holder 3 may be non-positively connected to the carrier 2 by means of clamping elements 4, 5 which may be drive-connected via levers 6, 7 to piezoelectric elements 8, 9. The piezoelectric elements 8, 9 may be supported at one end against the object holder 3 and housed in receptacles 10 of the object holder 3 provided for this purpose.

To apply a compressive force applied via a lever 6, 7 to several clamping elements 4, 5, clamping brackets 11, 12 may be provided, which may be respectively connected to the levers 6, 7 and the clamping elements 4, 5 in a shear-resistant manner and which may be limited by limit stops 13.

The levers 6, 7 each may include a base leg 14, from which protrude a short force arm 15, drive-connected to the piezoelectric element 8, 9, and a long force arm 16, drive-connected to the clamping element 4, 5 via the clamping bracket 11, 12. The two force arms 15, 16 may be essentially disposed parallel to each other and to the longitudinal axis of the piezoelectric element 8, 9 assigned to the lever 6, 7. The levers 6, 7 may be mounted at pivot points 17 on the object holder 3, where the respective pivot point 17 may be arranged in a transition area between the base leg 14 and the short force arm 15 in such a way that the compressive force applied by the piezoelectric elements 8, 9 via the levers 6, 7 is deflected by 90° and introduced into the clamping elements 4, 5 via the clamping brackets 12, 11 supported against the limit stops 13.

In an embodiment, the carrier 2 forms a circular hollow cylinder, the inner diameter of which exceeds the largest outer diameter of the object holder 3, which may be designed as a circular disc, so that the clamping elements 4, 5 project beyond the largest outer diameter of the object holder 3, at least in the case of a non-positive connection between the object holder 3 and the carrier 2. In such an embodiment, the object holder 3 may be non-positively connected to the carrier 2 exclusively via the clamping elements 4, 5 so that the object holder 3 may be freely supported within the carrier 2.

Figure 2:
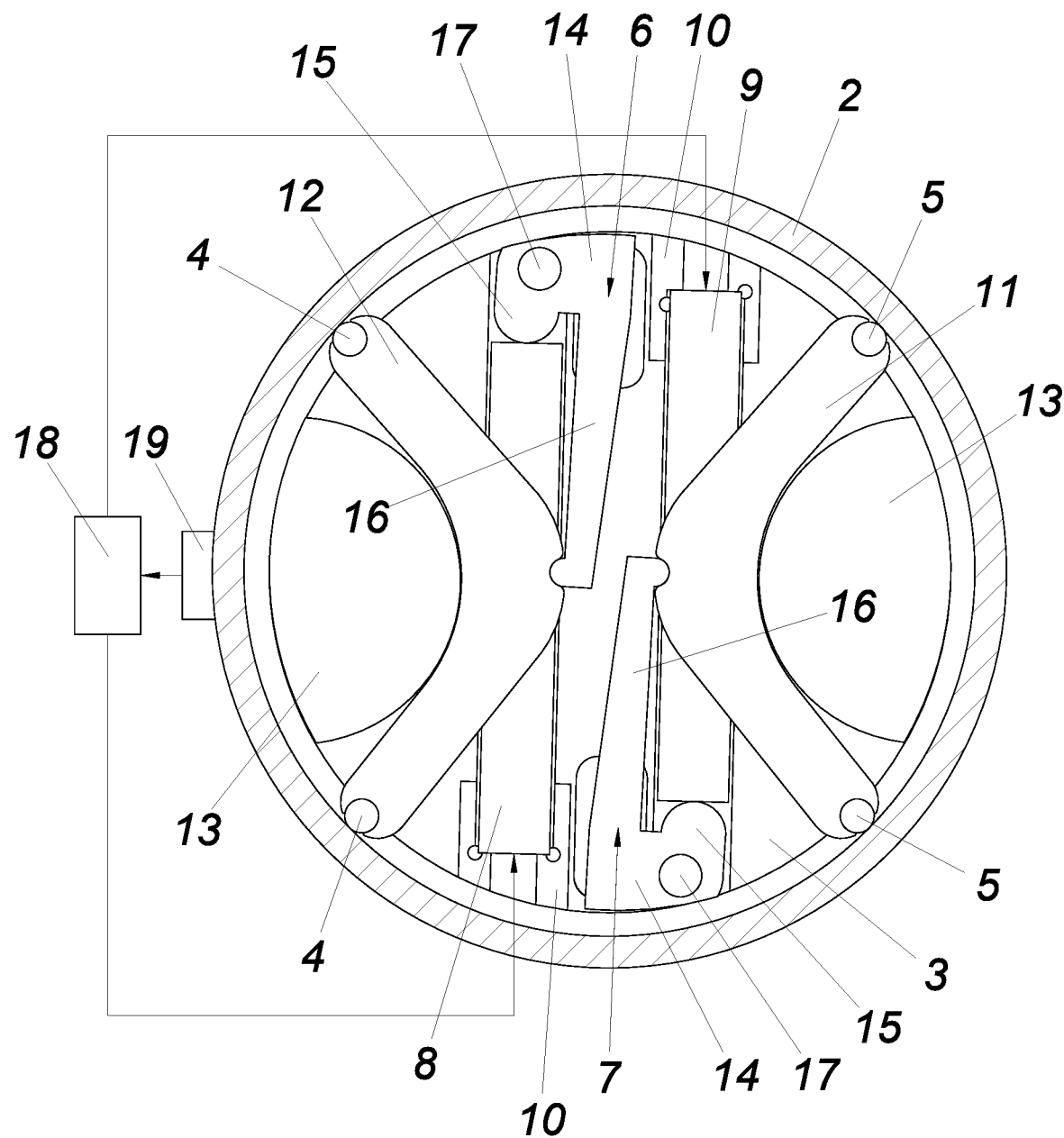
FIG. 2 shows a section through a device transversely with respect to the longitudinal axis of the carrier along line II-II of FIG. 1 on a larger scale, according to an embodiment of the system described herein.
Figure 3:
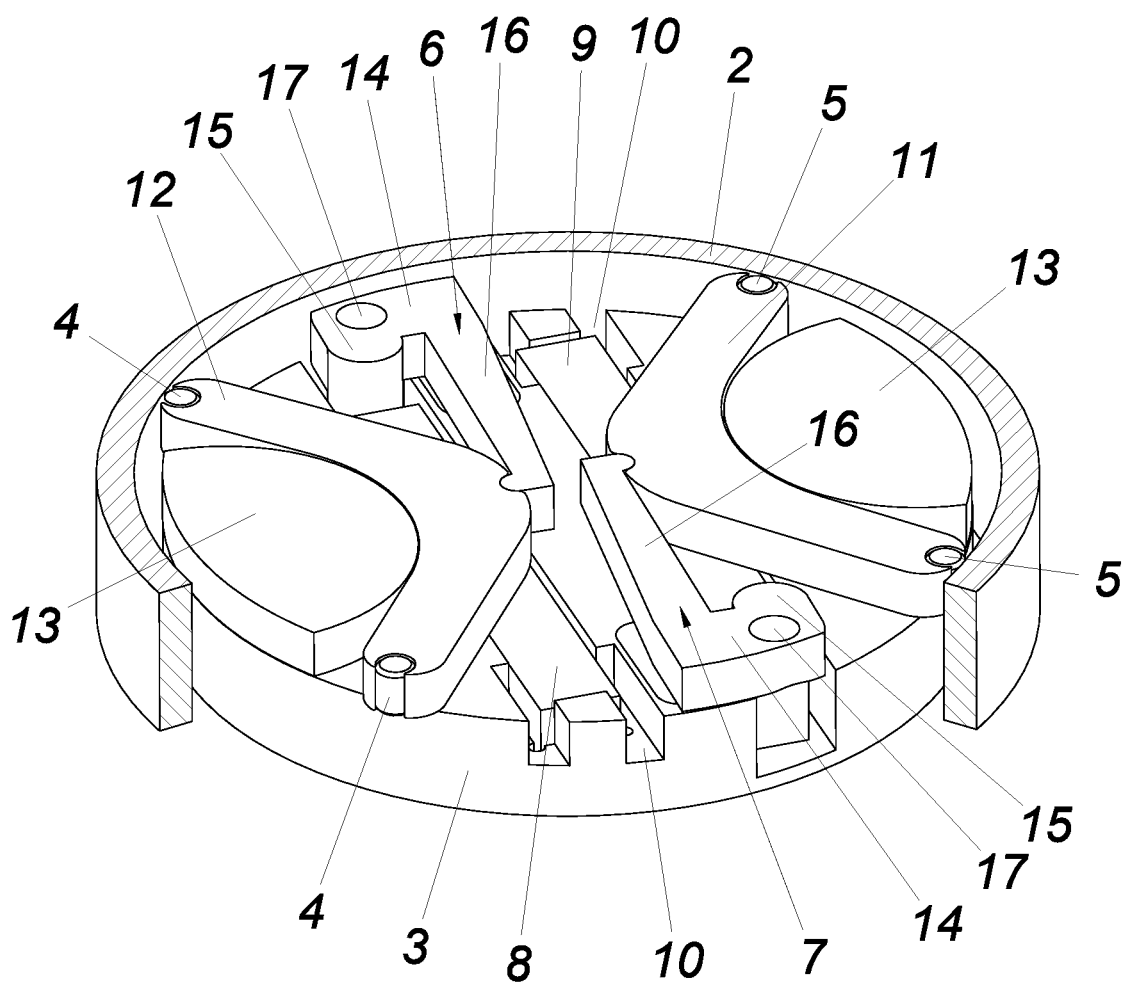
FIG. 3 shows a partially elevated perspective representation of the device corresponding to FIG. 2, according to an embodiment of the system described herein.

A particularly space-saving embodiment of the device of the system described herein may be obtained if, as shown in FIGS. 2 and 3, the two levers 6, 7 are point-symmetrical to each other, for example, with respect to an axis of rotation of the disc-shaped object holder 3. In such an embodiment, the piezoelectric elements 8, 9 together with at least a section of the short force arms 15 may lie in a drive plane of the object holder 3, and the long force arms 16, clamping brackets 11, 12, the limit stops 13 and the clamping elements 4, 5 together may lie in a plane of action parallel to the drive plane.

A control device 18 may be provided for actuating the piezoelectric elements 8, 9, which applies voltage to the piezoelectric elements 8, 9 depending on temperature and on a bearing specification and thus effects a non-positive connection between the object holder 3 and carrier 2 via a drive of the clamping elements 4, 5. The control device may include a characteristic curve memory for a temperature-dependent drive voltage, which provides a voltage specification for the piezoelectric elements 8, 9 for predetermined temperature values and predetermined bearing specifications.

In order to detect and suppress resonance effects of the device as far as possible, a resonance detector 19 connected to the control device 18 may be provided. If the detector 19 detects occurring resonance effects, the control device 18 may vary the voltage applied to the piezoelectric elements 8, 9 in such a way that the resonance effects largely decay due to the varying bearing pressure between the clamping elements 4, 5 and the carrier 2 or the varying material properties of the piezoelectric elements 8, 9.

Other embodiments of the invention will be apparent to those skilled in the art from a consideration of the specification and/or an attempt to put into practice the invention disclosed herein. It is intended that the specification and examples be considered as exemplary only, with the true scope and spirit of the invention being indicated by the following claims.

What is claimed is:

1. A device for mounting an object holder on a carrier for introducing objects into a cryostat, comprising:
   at least one clamping element that provides a mechanical connection by applying a force between the object holder and the carrier;
   a lever; and
   a piezoelectric element supported against the object holder or the carrier, wherein the carrier is drive-connected via the lever to the piezoelectric element and wherein the piezoelectric element is subjected to voltage by a control device as a function of temperature and a bearing specification.

2. The device according to claim 1, wherein the control device includes a characteristic curve memory that has a voltage specification for the piezoelectric element for predetermined temperature values and for predetermined bearing specifications.

3. The device according to claim 1, wherein there are at least two clamping elements arranged on a stop-limited clamping bracket connected in a shear-resistant manner to the lever.

4. The device according to claim 1, wherein the lever includes a base leg from which protrudes a short force arm drive-connected to the piezoelectric element and a long force arm drive-connected to the clamping element, the pivot point of the lever being located in a transition area between the base leg and the short force arm, and the long force arm being arranged substantially parallel to the longitudinal axis of the piezoelectric element.

5. The device according to claim 1, wherein there are at least two clamping elements that connect the object holder to the carrier exclusively via at least two clamping elements that are drive-connected via levers to at least two piezoelectric elements supported against the object holder.

6. The device according to claim 5, wherein the at least two piezoelectric elements are arranged in receptacles of the object holder and wherein the piezoelectric elements lying in at least one drive plane are drive-connected via levers to the at least two clamping elements lying in a plane of action arranged parallel to the at least one drive plane.

7. The device according to claim 6, wherein the at least two piezoelectric elements are arranged parallel to one another in the at least one drive plane and wherein the levers extend in a point-symmetrical manner to one another and connect the piezoelectric elements to the at least two clamping elements via the at least two clamping brackets lying in the plane of action.

8. The device according to claim 1, wherein the carrier forms a circular hollow cylinder, the inner diameter of which exceeds the largest outer diameter of the object holder and wherein the at least one clamping element is connected to the carrier project beyond the largest outer diameter of the object holder.

9. A method of operating a device for mounting an object holder on a carrier for introducing objects into a cryostat, comprising:
   inserting the object holder into the carrier at an initial temperature and a bearing specification for a control device that provides voltage to a piezoelectric element to prevent a connection with the carrier, wherein a bearing specification for a mechanical connection that applies a force to the carrier is predetermined; and
   the control device adapting the voltage applied to the piezoelectric element as a function of the temperature according to a characteristic curve.

10. The method according to claim 9, further comprising:
    detecting resonance effects of the device; and
    varying the bearing specification and/or the voltage applied to the piezoelectric element within a predetermined value range until the resonance effects have reached a minimum.

11. A method of operating a device for mounting an object holder on a carrier for introducing objects into a cryostat, comprising:
    actuating a piezoelectric element supported against the object holder or the carrier by applying a voltage to the piezoelectric element to cause an expansion of the piezoresistive element that results in a mechanical connection that applies a force to the object holder with the carrier using at least one clamping element.

12. The method according to claim 11, further comprising:
    providing a voltage specification for the piezoelectric elements for predetermined temperature values and predetermined bearing specifications; and
    determining the applied voltage based on the voltage specification.

13. The method according to claim 11, wherein the voltage is a function of temperature and a bearing specification.

14. The method according to claim 11, further comprising:
    detecting resonance effects of the device; and
    varying the bearing specification and/or the voltage applied to the piezoelectric elements to reduce the resonance effects.

15. The method according to claim 14, wherein voltage is varied within a predetermined value range until the resonance effects have reached a minimum.

16. The method according to claim 11, further comprising:
    inserting the object holder into the carrier at an initial temperature and a bearing specification that prevents the connection with the carrier; and
    after insertion of the object holder, adapting the applied voltage to effect the connection.

* * * * *